United States Patent [19]

Shoji

[11] Patent Number: 5,007,815
[45] Date of Patent: Apr. 16, 1991

[54] MOLD ASSEMBLY FOR PRODUCING SKIN-COVERED FOAMED PLASTIC ARTICLE

[75] Inventor: Makoto Shoji, Kanagawa, Japan

[73] Assignee: Ikeda Bussan Co., Ltd., Ayase, Japan

[21] Appl. No.: 426,554

[22] Filed: Oct. 25, 1989

[30] Foreign Application Priority Data

Oct. 31, 1988 [JP] Japan .......................... 63-142207[U]

[51] Int. Cl.$^5$ ...................... B29C 39/10; B29C 39/26
[52] U.S. Cl. ........................... 425/117; 249/93; 249/95; 264/46.6; 425/817 R
[58] Field of Search ................... 425/4 R, 817 R, 117, 425/125, 388, 111; 264/46.4, 46.5, 46.6, 46.7, 46.8; 249/93, 91, 95

[56] References Cited

U.S. PATENT DOCUMENTS

| 4,115,736 | 9/1978 | Sanson et al. | 425/388 |
| 4,824,070 | 4/1989 | Mizuno et al. | 249/93 |
| 4,833,741 | 5/1989 | Mizuno et al. | 264/46.4 |

FOREIGN PATENT DOCUMENTS 1224027 9/1966 Fed. Rep. of Germany ..... 264/46.7
2190621 11/1987 United Kingdom ............... 264/46.4

Primary Examiner—Jay H. Woo
Assistant Examiner—Khanh P. Nguyen
Attorney, Agent, or Firm—Foley & Lardner

[57] ABSTRACT

A mold assembly for producing a skin-covered foamed plastic article includes a lower mold having a cavity formed therein, the lower mold including a bottom wall, an outer wall which extends around a periphery of the bottom wall to define the cavity, and an inner wall which extends inside of the outer wall with a given space defined therebetween, the inner wall being covered by an outside part of an outer skin member when the outer skin member is properly put in the cavity. The assembly further includes an upper mold which is to be put on the lower mold to close the cavity, the upper mold having a depressed given portion which is mated with the entire of a top of the inner wall of the lower mold when the upper mold is properly put on the lower mold; and a retaining member constructed of a resilient material. The retaining member has such a channel structure as to resiliently and detachably receive therein the inner wall with the outside part of the outer skin member sandwiched therebetween.

7 Claims, 1 Drawing Sheet

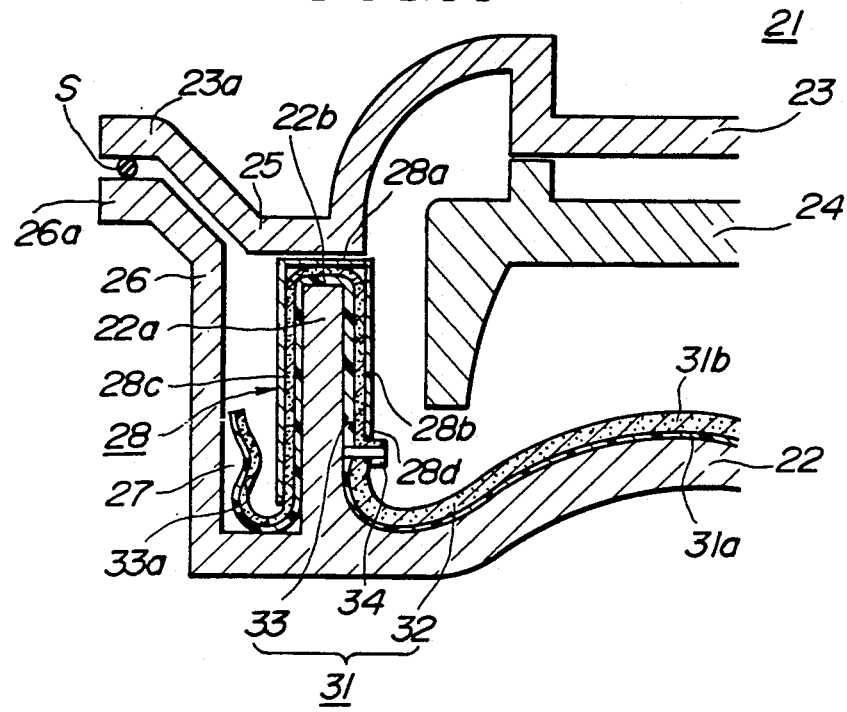
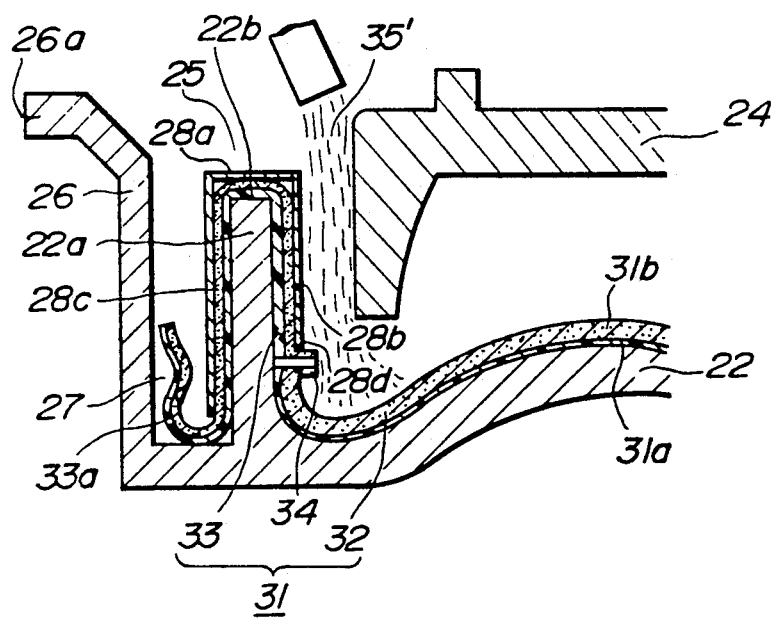

MOLD ASSEMBLY FOR PRODUCING SKIN-COVERED FOAMED PLASTIC ARTICLE

BACKGROUND OF THE INVENTION

1. Field of the Invention

The present invention relates in general to a mold assembly for producing a foamed plastic article, and more particularly to a mold assembly for producing a skin-covered foamed plastic article, such as a skin-covered pad for a seat cushion and/or a seatback of a seat.

2. Description of the Prior Art

Hitherto, in the field of manufacturing skin-covered foamed plastic articles, a method has been employed which generally comprises placing a bag-shaped outer skin member in a mold, pouring a liquid foamable plastic material into the outer skin member in the mold, and curing the material and removing a product, viz., a skin-covered foamed plastic article, from the mold upon the product being hardened to a sufficient level. However, hitherto, it has been difficult or at least troublesome to properly and stably set the outer skin member in a right position of the mold. In fact, during curing of the material in the mold, the outer skin member is subjected to a notable pressure due to vigorous foaming of the material, so that it tends to occur that the outer skin member is displaced from the right position. This causes deterioration in quality of the products.

One of the methods hitherto employed for eliminating the above-mentioned drawback is to use a double-sided adhesive tape for assuring the stable positioning of the outer skin member relative to the mold during the curing of the material. That is, the outer skin member is attached to the cavity wall of the mold with interposal of the double-sided adhesive tape therebetween.

However, usage of the adhesive tape has sometimes caused the products to be soiled considerably due to the adhesive remained thereon. In addition, it has occured that the products are somewhat damaged when the tape is peeled or removed from the products. These drawbacks have become much severe particularly when producing large-sized articles, such as, pads for a vehicle seat.

SUMMARY OF THE INVENTION

It is therefore an object of the present invention to provide a mold assembly for producing a skin-covered foamed plastic article, which is free of the above-mentioned drawbacks.

According to the present invention, there is provided a mold assembly for producing a skin-covered foamed plastic article. The mold assembly comprises a lower mold having a cavity formed therein, the lower mold including a bottom wall, an outer wall which extends around a periphery of the bottom wall to define the cavity, and an inner wall which extends inside of the outer wall with a given space defined therebetween, the inner wall being covered by an outside part of an outer skin member when the outer skin member is properly put in the cavity; an upper mold which is to be put on the lower mold to close the cavity, the upper mold having a depressed given portion which is mated with the entire of a top of the inner wall of the lower mold when the upper mold is properly put on the lower mold; and a retaining member constructed of a resilient material, the retaining member having such a channel structure as to resiliently and detachably receive therein the inner wall with the outside part of the outer skin member sandwiched therebetween.

BRIEF DESCRIPTION OF THE DRAWINGS

Preferred features and advantages of the present invention will become apparent from the following description when taken in conjunction with the accompanying drawings, in which:

FIG. 1 is a partial sectional view of a mold assembly according to the present invention, with a bag-shaped outer skin member properly set in a lower molde;

FIG. 2 is a view similar to FIG. 1, but showing a condition wherein a liquid foamable plastic material is being poured into the lower mold; and FIG. 3 is a partial sectional view of a skin-covered foamed plastic article, which is produced by using the mold assembly of the present invention.

DETAILED DESCRIPTION OF THE INVENTION

In the following, the present invention will be described in detail with reference to the accompanying drawings.

Referring to FIGS. 1 and 2, there is shown a mold assembly 21 according to the present invention. The mold assembly 21 shown is designed to produce a skin-covered pad for a seat cushion.

The mold assembly 21 comprises a rectangular lower mold 22 and a rectangular upper mold 23 which is to be put on the lower mold 22.

Designated by numeral 24 is a rectangular core device which is detachably connected to the lower mold 22.

Designated by numeral 28 is one of two retaining members 28 which are used for retaining an outer skin member 31 to the lower mold 22 as will become apparent as the description proceeds.

The lower mold 22 comprises a rectangular swelled bottom wall (no numeral), an outer wall 26 which extends around the periphery of the swelled bottom wall, and two inner walls 22a (only one is shown) which are located inside of the outer wall 26 and extend substantially in parallel with each other. Each inner wall 22a extends along the outer wall 26 with a given space 27 defined therebetween. Although not shown in the drawings, each inner wall 22a has both ends integrally connected to the outer wall 26. The inner surface of the swelled bottom wall, inner surfaces of the two inner walls 22a and a remaining part of the outer wall 26 thus define a rectangular cavity of the lower mold 22. An upper portion 26a of the outer wall 26 is bent outwardly to constitute a seating stage for the upper mold 23.

The rectangular upper mold 23 comprises two depressed lower portions 25 (only one is shown) and a rectangularly extending raised peripheral portion 23a. When, as is shown in FIG. 1, the upper mold 23 is properly put on the lower mold 22, the depressed lower portions 25 of the upper mold 23 are seated on tops 22b of the inner walls 22a of the lower mold 22 and at the same time the raised peripheral portion 23a of the upper mold 23 are seated on the stage portion 26a of the lower mold 22 respectively. Designated by reference S is a seal ring which is put between the stage portion 26a of the lower mold 22 and the raised peripheral portion 23a of the upper mold 23 for achieving an airtight sealing therebetween.

Each retaining member 28 is constructed of a resilient material, such as metal, plastic or the like, which has such a channel structure as to resiliently and detachably receive therein one of the inner walls 22a of the lower mold 22. The material of the retaining member 28 should have sufficient durability against heat and chemical. The retaining member 28 thus comprises a top base wall 28a, an inner wall 28b extending downwardly from an inner periphery of the base wall 28a and an outer wall 28c extending downwardly from an outer periphery of the base wall 28a. For the reason which will be clarified hereinafter, the height of the inner wall 28b is somewhat smaller than the outer wall 28c, as shown.

In the following, the steps for producing a skin-covered foamed plastic article 40 (see FIG. 3) will be described.

First, a bag-shaped outer skin member 31 is prepared. The outer skin member 31 has been constructed to match with the cavity of the lower mold 22, comprising generally three parts, which are a center part and two outside parts 33 (only one is shown) which are stitched at portions 34 to one another to constitute the bag-shaped structure. Each part comprises an outer skin layer 31a and a wadding 31b lined on a back surface of the outer skin layer 31a.

The bag-shaped outer skin member is put into the cavity of the lower mold 22 having outside parts 33 thereof entirely covering the inner walls 22a of the lower mold 22.

Then, each retaining member 28 is resiliently received on the corresponding inner wall 22a having the corresponding outside part 33 of the outer skin member 31 intimately disposed therebetween, as is seen from FIG. 2. It is to be noted that when the retaining member 28 is properly set on the inner wall 22a, the lower edge 28d of the inner wall 28b of the retaining member 28 contacts the stitched portion 34 of the outer skin member 31. Thus, under this condition, the outer skin member 31 is tightly set in the cavity of the lower mold 22 due to the work of the two retaining members 28. Each peripheral part 33a of the outer skin member 31 is loosely disposed in the space 27 defined between the outer wall 26 and the corresponding inner wall 22a.

Then, the core device 24 is properly set in the cavity, and then a liquid foamable plastic material 35', such as foamable polyurethane material or the like, is poured into the bag-shaped outer skin member 31 in the mold 22 through a clearance defined between the inner wall 22a and the core mold 24, as is shown in FIG. 2. At once, the upper mold 23 is put on the lower mold 22 to close the cavity. Thus, thereafter, the material is forced to cure in the enclosed space defined by the lower and upper molds 22 and 23.

As is seen from FIG. 1, when the upper mold 23 is properly put on the lower mold 22, the depressed lower portions 25 of the upper mold 23 press the top base walls 28a of the two retaining members 28 and thus the outside parts 33 of the outer skin member 31 against the tops of the two inner walls 22a of the lower mold 22. Thus, the outer skin member 31 is much more stably held in the cavity.

After the foamable plastic material in the cavity is hardened to a certain level, the upper mold 23 and the core device 24 are removed from the lower mold 22, and then, the retaining members 28 are removed from the inner walls 22a. With these steps, the skin-covered foamed article 40 as shown in FIG. 3 is produced.

Obviously, many modifications and variations of the present invention are possible in light of the above teachings. It is to be understood therefore that within the scope of the appended claims, the present invention may be practiced otherwise than as specifically described herein.

What is claimed is:

1. A mold assembly for producing a skin-covered foamed plastic article, comprising:
    a lower mold having a cavity formed therein, said lower mold including a bottom wall, an outer wall which extends around a periphery of said bottom wall, and an inner wall which extends inside of a first portion of said outer wall with a given clearance defined therebetween, said inner wall having two opposed ends integrally connected to said outer wall, said inner wall being adapted to be covered with an outside part of an outer skin member when said outer skin member is properly positioned within said cavity, said cavity being defined by said bottom wall, a portion of said outer wall, and said inner wall;
    a retaining member constructed of a resilient material, said retaining member defining a channel which is adapted to resiliently and detachably receive therein said inner wall with said outside part of said outer skin sandwiched therebetween, said retaining member including a top base wall, an inner wall extending downwardly from an inner edge of said top base wall, and an outer wall extending downwardly from an outer edge of said top base wall; and
    an upper mold which is adapted to be placed on top of said lower mold to lose said cavity, said upper mold having a depressed portion which contacts said top base wall of said retaining member when said upper mold is properly positioned on said lower mold.

2. A mold assembly as claimed in claim 1, in which the height of said inner wall of said retaining member is smaller than that of said outer wall of said retaining member.

3. A mold assembly as claimed in claim 1, in which said retaining member is constructed of a resilient material which has a sufficient durability against heat and chemicals.

4. A mold assembly as claimed in claim 3, in which said retaining member is constructed of one of metal and plastic.

5. A mold assembly as claimed in claim 3, in which said inner wall of said retaining member is so sized that when said retaining member is properly put on said inner wall of said lower mold, a leading end of an inner wall of said retaining member contacts a stitched portion of said outer skin member.

6. A mold assembly as claimed in claim 1, further comprising a core mold which is to be detachably installed in said cavity.

7. A mold assembly as claimed in claim 1, further comprising another inner wall which extends inside of a second portion of said outer wall with a given space defined therebetween, said another inner wall having opposed ends integrally connected to said outer wall.

* * * * *